US010803730B2

(12) United States Patent
Coria et al.

(10) Patent No.: US 10,803,730 B2
(45) Date of Patent: Oct. 13, 2020

(54) COGNITIVELY DETERMINING A TIME OF AN ALARM

(71) Applicant: INTERNATIONAL BUSINESS MACHINES CORPORATION, Armonk, NY (US)

(72) Inventors: Eduardo M. Coria, San Jose, CA (US); Hernan Badenes, S. M. Andres (AR); Diego A. Masini, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/826,768

(22) Filed: Nov. 30, 2017

(65) Prior Publication Data

US 2019/0164409 A1 May 30, 2019

(51) Int. Cl.
G08B 21/24 (2006.01)
H04L 29/08 (2006.01)
H04L 12/58 (2006.01)

(52) U.S. Cl.
CPC .............. *G08B 21/24* (2013.01); *H04L 51/20* (2013.01); *H04L 67/22* (2013.01)

(58) Field of Classification Search
CPC .......... G08B 21/24; H04L 51/20; H04L 67/22
USPC ........................................................ 709/224
See application file for complete search history.

(56) References Cited

U.S. PATENT DOCUMENTS 6,177,905 B1    1/2001  Welch
6,943,671 B2    9/2005  McGee et al.
7,583,972 B2    9/2009  Clipsham
8,432,267 B2    4/2013  Lee et al.
8,823,507 B1*   9/2014  Touloumtzis ........... H04L 67/24
                                                    340/501

(Continued)

FOREIGN PATENT DOCUMENTS

EP    1916850    4/2008

OTHER PUBLICATIONS

Fitzpatrick, G.P.; Time-Variable Event-Contingent Alarm/Reminder for Calendars; IP.com; IPCOM000111631D; Mar. 1, 1994; 1 page (Abstract).

(Continued)

*Primary Examiner* — Vivek Srivastava
*Assistant Examiner* — Binod J Kunwar
(74) *Attorney, Agent, or Firm* — Schmeiser, Olsen & Watts; Mark C. Vallone

(57) ABSTRACT

An approach is provided for determining a time of an alarm. Natural language processing determines a meaning of user input which specifies the alarm, an event, an action, and an amount of time. The alarm notifies the user about the action the user is to take prior to the event, which will occur at an indefinite time. The alarm is triggered at a time that precedes an estimated time of the event by the amount of time. Information is retrieved that describes movements and usage of a mobile device of the user, profile information, historical user behavior, calendar appointments, messages sent and received by the user of the user, and social network contacts and user-generated content. The estimated time of the event is generated. The time of the alarm is determined as a time that precedes the estimated time of the event by the amount of time.

20 Claims, 4 Drawing Sheets

(56) References Cited

U.S. PATENT DOCUMENTS

| | | | |
|---|---|---|---|
| 2009/0048866 A1* | 2/2009 | Mahesh | G06Q 10/10 |
| | | | 705/2 |
| 2010/0075648 A1* | 3/2010 | Matsuoka | H04M 1/72566 |
| | | | 455/418 |
| 2011/0215933 A1* | 9/2011 | Darling, IV | G06Q 10/109 |
| | | | 340/573.1 |
| 2013/0159270 A1* | 6/2013 | Urmy | G06Q 10/0631 |
| | | | 707/706 |
| 2014/0004889 A1* | 1/2014 | Davis | H04L 67/306 |
| | | | 455/466 |
| 2014/0035949 A1* | 2/2014 | Singh | G06Q 10/109 |
| | | | 345/629 |
| 2014/0195252 A1* | 7/2014 | Gruber | G10L 15/22 |
| | | | 704/275 |
| 2015/0180816 A1 | 6/2015 | Varoglu et al. | |
| 2016/0150394 A1* | 5/2016 | Varoglu | H04W 4/029 |
| | | | 455/418 |
| 2016/0165038 A1 | 6/2016 | Lim et al. | |
| 2016/0173631 A1* | 6/2016 | McKay | H04L 67/22 |
| | | | 709/203 |
| 2017/0105190 A1* | 4/2017 | Logan | H04W 68/00 |
| 2017/0188979 A1* | 7/2017 | Volpe | A61B 5/7282 |
| 2017/0288960 A1* | 10/2017 | Fennel | H04L 41/0803 |
| 2018/0083913 A1* | 3/2018 | Ganesh | H04L 51/24 |
| 2018/0268345 A1* | 9/2018 | Tolica | G06Q 10/063114 |

OTHER PUBLICATIONS

Rokhman, Nur et al.; Location and time based reminder system on Android mobile device; 2016 2nd International Conference on Science in Information Technology; Oct. 26-27, 2016; 3 pages (Abstract).

IBM; Method and System for calendaring reminder base on locations information; IP.com; IPCOM000173694D; Aug. 21, 2008; 5 pages.

Graus, David et al.; Analyzing and Predicting Task Reminder; Proceedings of the 2016 Conference on User Modeling Adaptation and Personalization; Jul. 13-17, 2016; pp. 7-15.

* cited by examiner

COGNITIVELY DETERMINING A TIME OF AN ALARM

BACKGROUND

The present invention relates to managing a timing of an alarm, and more particularly to determining a time of an alarm based on an event whose time is indefinite.

People rely on their computing devices (e.g., smartphones) to remind them of different events. Known notification techniques provide alarms via the computing devices by setting an alarm to be activated at a particular time or in response to an event happening. For example, a user sets an alarm on a mobile device to wake the user up at 7:00 AM. As another example, the user sets an alert to be activated in response to detecting that a messaging contact is online. As yet another example, a user sets a reminder to be activated when the user is close to a particular geographic location.

SUMMARY

In one embodiment, the present invention provides a method of determining a time of an alarm. The method includes a computer determining a meaning of natural language input provided by a user by using natural language processing. The meaning specifies the alarm, an event which will occur at a time that is indefinite and unscheduled, an action to be taken by the user, and an amount of time. The alarm notifies the user about the action to be taken prior to the event. The alarm is triggered at a time that precedes an estimated time of the event by the amount of time. The method further includes the computer retrieving information that includes data describing movements of a mobile device of the user, data describing usage of the mobile device, profile information about the user, historical behavior of the user, appointments in a calendar application used by the user, messages sent and received by the user, content generated by the user on a social networking service, and social networks of the user which are managed by the social networking service. The method further includes based on the retrieved information, the computer generating the estimated time of the event by using one or more cognitive computing techniques. The method further includes the computer determining the time of the alarm as a time that precedes the estimated time of the event by the amount of time.

In another embodiment, the present invention provides a computer program product for determining a time of an alarm. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes the computer system determining a meaning of natural language input provided by a user by using natural language processing. The meaning specifies the alarm, an event which will occur at a time that is indefinite and unscheduled, an action to be taken by the user, and an amount of time. The alarm notifies the user about the action to be taken prior to the event. The alarm is triggered at a time that precedes an estimated time of the event by the amount of time. The method further includes the computer system retrieving information that includes data describing movements of a mobile device of the user, data describing usage of the mobile device, profile information about the user, historical behavior of the user, appointments in a calendar application used by the user, messages sent and received by the user, content generated by the user on a social networking service, and social networks of the user which are managed by the social networking service. The method further includes based on the retrieved information, the computer system generating the estimated time of the event by using one or more cognitive computing techniques. The method further includes the computer system determining the time of the alarm as a time that precedes the estimated time of the event by the amount of time.

In another embodiment, the present invention provides a computer system including a central processing unit (CPU); a memory coupled to the CPU; and a computer readable storage device coupled to the CPU. The storage device includes instructions that are executed by the CPU via the memory to implement a method of determining a time of an alarm. The method includes the computer system determining a meaning of natural language input provided by a user by using natural language processing. The meaning specifies the alarm, an event which will occur at a time that is indefinite and unscheduled, an action to be taken by the user, and an amount of time. The alarm notifies the user about the action to be taken prior to the event. The alarm is triggered at a time that precedes an estimated time of the event by the amount of time. The method further includes the computer system retrieving information that includes data describing movements of a mobile device of the user, data describing usage of the mobile device, profile information about the user, historical behavior of the user, appointments in a calendar application used by the user, messages sent and received by the user, content generated by the user on a social networking service, and social networks of the user which are managed by the social networking service. The method further includes based on the retrieved information, the computer system generating the estimated time of the event by using one or more cognitive computing techniques. The method further includes the computer system determining the time of the alarm as a time that precedes the estimated time of the event by the amount of time.

Embodiments of the present invention provide an enhanced virtual digital assistant by using machine learning and cognitive technologies to determine a time and conditions for triggering an alarm that reminds a user to take an action based on an event that will occur at an indefinite time, thereby avoiding the inflexibility and limitations of known alarms that are based on a definite, fixed time or location of the user.

DETAILED DESCRIPTION

Overview

Embodiments of the present invention use various sources of information and machine learning techniques to generate an alarm (i.e., a reminder or notification) to take an action at a time prior to an event whose starting time is indefinite, where the starting time of the event is estimated by using cognitive computing. In one embodiment, a user of a smartphone's enhanced digital assistant uses written or spoken natural language to request the assistant to set a reminder to be triggered at a particular amount of time prior to a time of an occurrence of an event or condition, where the time of the occurrence is indefinite. The user's smartphone includes computer processing power, a connection to the Internet, data describing movements and usage of the smartphone, and the user's profile information, historical behavior, messages, calendar, and social network. Natural language processing techniques analyze the request to determine the meaning of the request and cognitive computing techniques use the information on the user's smartphone and other contextual data to estimate the time of the occurrence of the event or condition. The cognitive computing techniques may monitor a set of conditions to determine whether the conditions are satisfied before estimating the time of the occurrence of the event or condition. As the conditions change, the cognitive computing techniques dynamically update the estimated time of the occurrence of the event or condition, thereby updating the time that the alarm will be triggered. In response to reaching the time that is the specified amount of time prior to the estimated time of the event or condition, the alarm is triggered.

System for Cognitively Determining a Time of an Alarm

Figure 1:
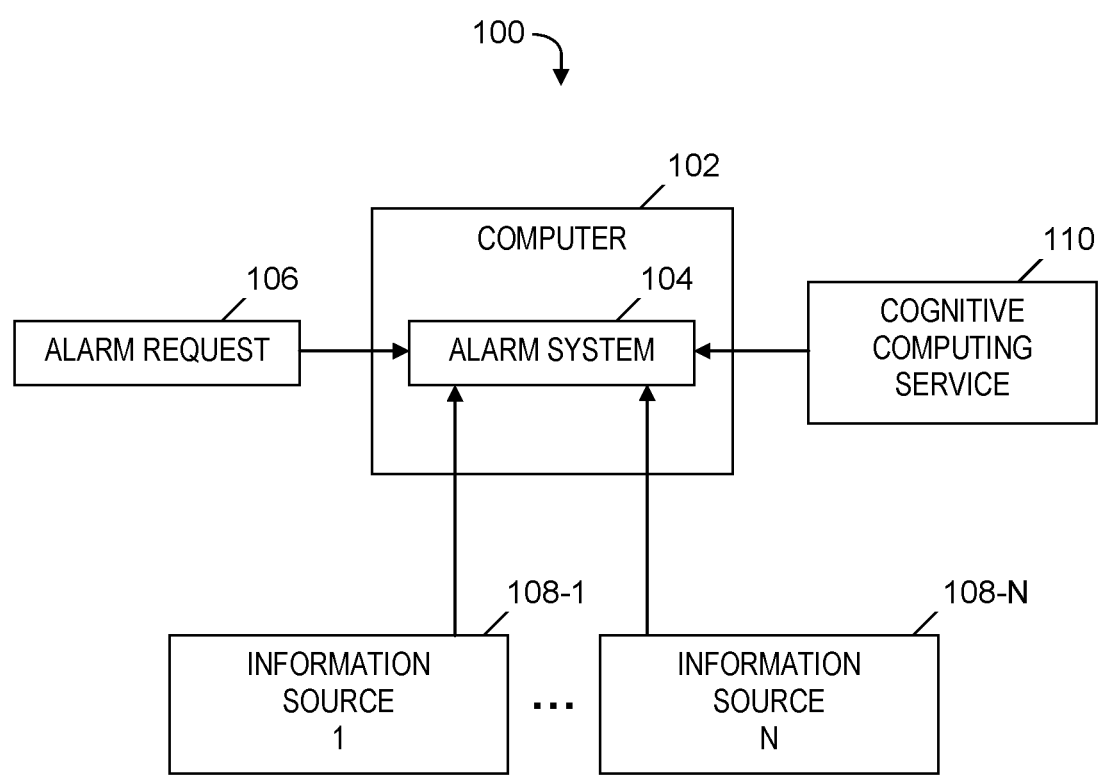
FIG. 1 is a block diagram of a system for cognitively determining a time of an alarm, in accordance with embodiments of the present invention.

FIG. 1 is a block diagram of a system 100 for cognitively determining a time of an alarm, in accordance with embodiments of the present invention. System 100 includes a computer 102 which executes a software-based alarm system 104. Alarm system receives an alarm request 106, which is verbal input or written input provided by a user, and uses natural language processing to determine an event Y that will occur at an indefinite and unscheduled time, an action X that the user is to take prior to the occurrence of event Y, and an amount of time T. Alarm request 106 requests an alarm to be triggered and presented to the user at a time that precedes an estimated time of the event by the amount of time T. The alarm reminds the user to take action X prior to the occurrence of event Y.

Alarm system 104 determines the N information source(s) (i.e., information source 108-1, . . . , information source 108-N) that are the sources of information needed to estimate the time of event Y, where N is an integer greater than or equal to one. In one embodiment, information sources 108-1, . . . , 108-N include (1) data describing movements of a mobile device of the user caused by the user handling and using the mobile device, (2) data describing usage of the mobile device, (3) appointments in a calendar application executed on the mobile device or another computing device used by the user, (4) messages sent and received by the user, including emails, text messages, and social media posts, (5) content generated by the user using social networking service(s), and (6) contacts of a user in social network(s) managed by the social networking service(s). In another embodiment, information sources 108-1, . . . , 108-N also include a geolocation of the mobile device of the user, where the geolocation is provided by a Global Positioning System navigation device, and/or data describing usage of devices in an Internet of Things network.

Alarm system uses information from information sources 108-1, . . . , 108-N and cognitive computing techniques provided by a cognitive computing service 110 (see FIG. 1) to determine an estimated time of event Y and a time to trigger the alarm which is based on the estimated time of event Y and the amount of time T.

Figure 2:
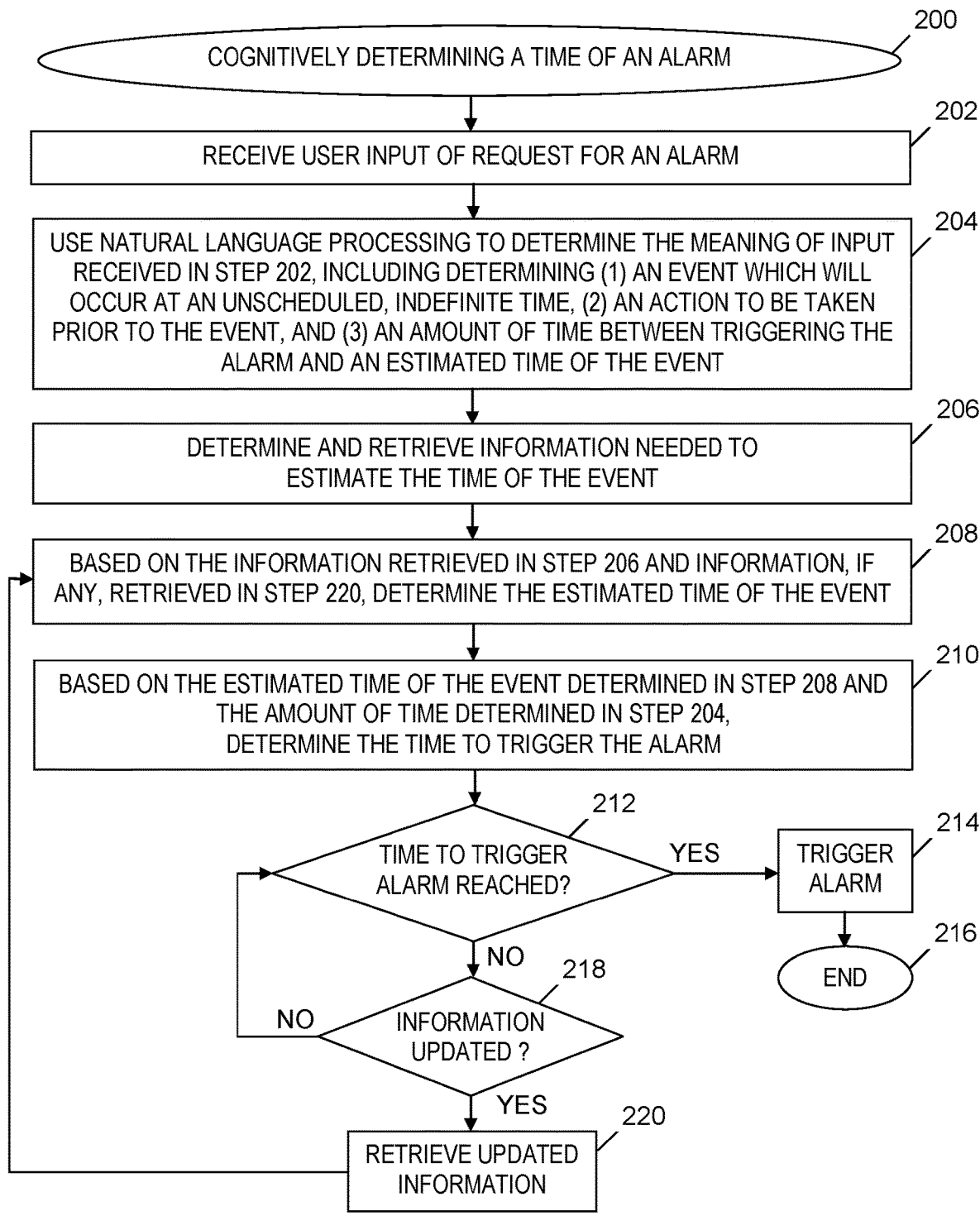
FIG. 2 is a flowchart of a process of cognitively determining a time of an alarm, in accordance with embodiments of the present invention.
Figure 3:
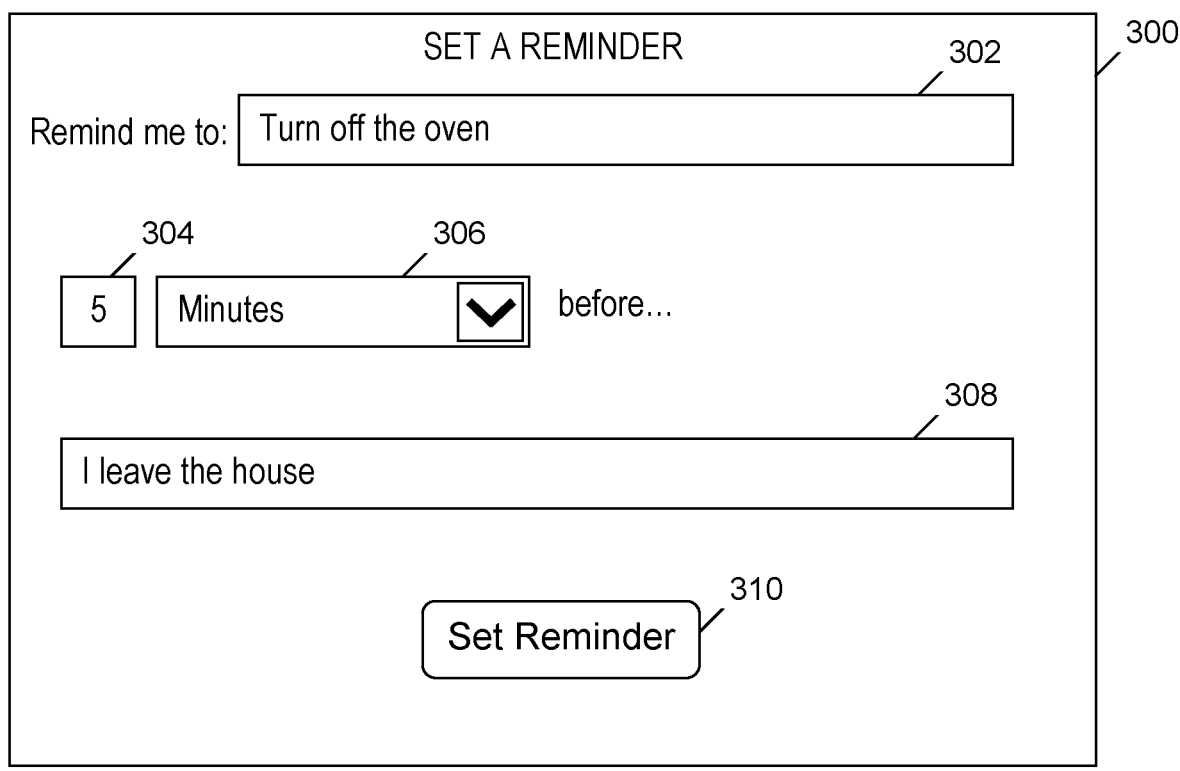
FIG. 3 is an example of an interface for entering information used in the process of FIG. 2, in accordance with embodiments of the present invention.
Figure 4:
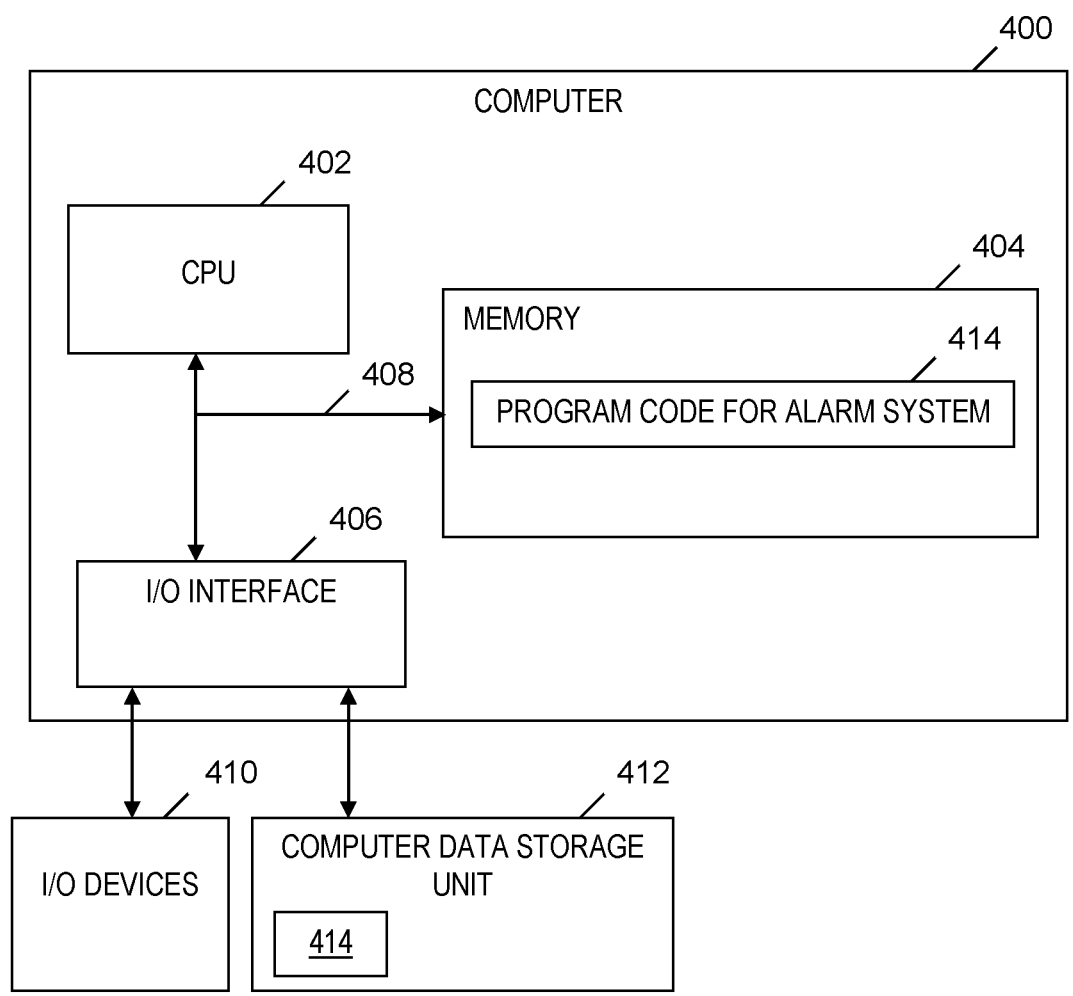
FIG. 4 is a block diagram of a computer included in the system of FIG. 1 and that implements the process of FIG. 2, in accordance with embodiments of the present invention.

The functionality of the components shown in FIG. 1 is described in more detail in the discussion of FIG. 2, FIG. 3, and FIG. 4 presented below.

Process for Cognitively Determining a Time of an Alarm

FIG. 2 is a flowchart of a process of cognitively determining a time of an alarm, in accordance with embodiments of the present invention. The process of FIG. 2 begins at step 200. In step 202, alarm system 104 (see FIG. 1) receives alarm request 106 (see FIG. 1), which is user-provided input which requests an activation (i.e., triggering) of an alarm which reminds the user to take an action at a time that precedes an estimated time of an event by a specified amount of time. In one embodiment, the time of the event is a time at which the event begins. Alternatively, alarm request 106 (see FIG. 1) is a request for an alarm to remind the user to take an action prior to a condition being met, where the alarm is activated (i.e., triggered) at a time that precedes an estimated time at which the condition is met by a specified amount of time.

Alarm request 106 (see FIG. 1) may be verbal input or written input. If alarm request 106 (see FIG. 1) is spoken input, alarm system 104 (see FIG. 1) employs a speech-to-text software tool to translate alarm request 106 (see FIG. 1) into text.

In step 204, alarm system 104 (see FIG. 1) uses natural language processing techniques to determine the meaning of alarm request 106 (see FIG. 1). The meaning determined in step 204 includes (1) an event which will occur at an unscheduled, indefinite time; (2) an action to be taken prior to the event; and (3) an amount of time between (i) activating (i.e., triggering) the alarm to remind the user to take the action prior to the event and (ii) an estimated time of the event.

In step 206, alarm system 104 (see FIG. 1) determines and retrieves information needed to estimate the time of the event. Alarm system 104 (see FIG. 1) retrieves the information in step 206 from information sources 108-1, . . . , 108-N (see FIG. 1). In embodiments of the present invention, the information retrieved in step 206 include combinations of: (1) data describing movements and orientation of a mobile device of the user caused by the user handling and using a mobile device of the user, (2) data describing usage of the mobile device, (3) appointments in a calendar application executed on the mobile device or another computing device used by the user, (4) messages sent and received by the user, including emails, text messages, and social media posts, (5) content generated by the user using one or more social networking services, (6) contacts of a user in one or more social networks managed by the one or more social networking services, (7) a geolocation of the mobile device of the user, where the geolocation is provided by a Global Positioning System navigation device, and (8) data describing usage of devices in an Internet of Things network. In one embodiment, the aforementioned movements and orientation of the mobile device are determined by data provided by an accelerometer in the mobile device.

In step 208, alarm system 104 (see FIG. 1) determines an estimated time of the event. Determining the estimated time in step 208 is based at least in part on the information retrieved in step 206.

In step 210, based on the estimated time of the event determined in step 208 and the amount of time determined in step 204, alarm system 104 (see FIG. 1) determines the time to activate the alarm.

In step 212, alarm system 104 (see FIG. 1) determines whether the time to activate the alarm has been reached (i.e., whether the current time is equal to or subsequent to the time to activate the alarm). If alarm system 104 (see FIG. 1) in step 212 determines that the time to activate the alarm has been reached, then the Yes branch of step 212 is followed and step 214 is performed. In step 214, alarm system 104 (see FIG. 1) activates the alarm. Following step 214, the process of FIG. 2 ends at step 216.

Returning to step 212, if alarm system 104 (see FIG. 1) determines that the time to activate the alarm has not been reached, then the No branch of step 212 is followed and step 218 is performed. In step 218, alarm system 104 (see FIG. 1) determines whether one or more parts (or all) of the information retrieved in step 206 has been updated since the retrieval of the information in step 206. If alarm system 104 (see FIG. 1) determines in step 218 that at least part of the information has been updated, then the Yes branch of step 218 is followed and step 220 is performed. In step 220, alarm system 104 (see FIG. 1) retrieves the updated information from one or more of information sources 108-1, . . . , 108-N (see FIG. 1) and the process of FIG. 2 loops back to step 208. In the loop back to step 208, alarm system 104 (see FIG. 1) determines an updated estimated time of the event based on the updated information retrieved in step 220 and based on other information that was retrieved in step 206 and that was not updated since its retrieval in step 206. If all information retrieved in step 206 was updated since the retrieval in step 206, then the loop back to step 208 includes alarm system 104 (see FIG. 1) determining the estimated time of the event based on the updated information which is retrieved in step 220.

Returning to step 218, if alarm system 104 (see FIG. 1) determines that no information has been updated since its retrieval in step 206, then the No branch of step 218 is followed and the process loops back to step 212.

FIG. 3 is an example of an interface 300 for entering information used to set a reminder (i.e., an alarm) in the process of FIG. 2, in accordance with embodiments of the present invention. Interface 300 includes a field 302 that accepts an entry of an action, which is "Turn off the oven." Interface 300 includes a field 304 that accepts a numeric input indicating an amount of time and a dropdown list 306 that provides values of different units of time that refer to the numeric input in field 304. Entries in field 304 and dropdown list 306 include "5" and "Minutes," respectively, which indicate the amount of time of 5 minutes. Interface 300 also includes a field 308 that accepts an entry of an event, which is "I leave the house." A user activating a button 310 in interface 300 causes alarm system 104 (see FIG. 1) to estimate a time at which the user will leave the house based on information retrieved from information sources 108-1, . . . , 108-N (see FIG. 1) and set a reminder that presents the message "Turn off the oven" five minutes before the estimated time of when the user will leave the house.

Computer System

FIG. 4 is a block diagram of a computer 102 included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for alarm system 104 (see FIG. 1) to perform a method of cognitively determining a time of an alarm, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to cognitively determine a time of an alarm. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 102 may include alarms generated by alarm system 104 (see FIG. 1) and information included in information sources 108-1, . . . , 108-N (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to cognitively determining a time of an alarm. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to cognitively determine a time of an alarm. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of cognitively determining a time of an alarm.

While it is understood that program code 414 for cognitively determining a time of an alarm may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of cognitively determining a time of an alarm. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of determining a time of an alarm, the method comprising the steps of:

a computer determining a meaning of natural language input provided by a user by using natural language processing, the meaning of the natural language input specifying (i) the alarm, (ii) an event which will occur at a time that is indefinite and unscheduled, (iii) an action to be taken by the user, and (iv) an amount of time, wherein the alarm notifies the user about the action to be taken prior to the event and the alarm is triggered at a time that precedes an estimated starting time of the event by the amount of time;

the computer retrieving information that includes data describing movements of a mobile device of the user, data describing usage of the mobile device, profile information about the user, historical behavior of the user, appointments in a calendar application used by the user, messages sent and received by the user, content generated by the user on a social networking service, and social networks of the user which are managed by the social networking service;

prior to the event and based on the data describing movements of the mobile device of the user, the data describing the usage of the mobile device, the profile information about the user, the historical behavior of the user, the appointments in the calendar application used by the user, the messages sent and received by the user, the content generated by the user on the social networking service, and the social networks of the user which are managed by the social networking service, the computer generating the estimated starting time of the event; and the computer determining the time of the alarm as a time that precedes the estimated starting time of the event by the amount of time specified by the meaning of the natural language input determined by using the natural language processing.

2. The method of claim 1, further comprising the steps of:

the computer determining whether a current time is equal to or subsequent to the time of the alarm; and if the current time is equal to or subsequent to the time of the alarm, the computer triggering the alarm, which notifies the user about the action to be taken prior to the event, or if the current time is prior to the time of the alarm, the computer determining that the information was updated subsequent to the step of retrieving the information, and in response and without triggering the alarm, the computer (i) retrieving an update of the information and based on the retrieved update of the information, (ii) generating an update of the estimated starting time of the event and (iii) determining an update of the time of the alarm as a time that precedes the update of the estimated starting time of the event by the amount of time.

3. The method of claim 1, further comprising the step of based at least in part on the event, the computer identifying one or more sources of the information on which the step of generating the estimated starting time of the event is based, wherein the step of retrieving the information includes retrieving the information from the identified one or more sources.

4. The method of claim 1, wherein the step of retrieving the information includes retrieving a geolocation of the mobile device by using a Global Positioning System navigation device, and wherein the step of generating the estimated starting time of the event is based in part on the retrieved geolocation of the mobile device.

5. The method of claim 1, wherein the step of retrieving the information includes retrieving data from devices in an Internet of Things network, and wherein the step of generating the estimated starting time of the event is based in part on the retrieved data from the devices in the Internet of Things network.

6. The method of claim 1, further comprising the steps of:
the computer determining that the user is in a first location and the event indicates that the user will leave the first location and travel to a second location which is different from the first location;
the computer generating an initial estimated starting time of the event based on the retrieved information, which does not include data describing a movement of the user away from the first location and toward the second location, wherein the step of generating the initial estimated starting time of the event is performed prior to the user leaving the first location to travel to the second location; and
the computer determining an initial time of the alarm as a time that precedes the initial estimated starting time of the event by the amount of time.

7. The method of claim 6, wherein the step of retrieving the information includes retrieving historical data describing (1) movements or usage of the mobile device that occur within a specified period of time prior to the user leaving a location that matches the first location, (2) an amount of time the user spends at one or more other locations before arriving at a location that matches the second location, and (3) an amount of time other users spend at the one or more other locations, and wherein the step of generating the initial estimated starting time of the event is based in part on the historical data.

8. The method of claim 1, further comprising the step of:
providing at least one support service for at least one of creating, integrating, hosting, maintaining, and deploying computer readable program code in the computer, the program code being executed by a processor of the computer to implement the steps of determining the meaning of the natural language input, retrieving the information, generating the estimated starting time of the event, and determining the time of the alarm.

9. A computer program product for determining a time of an alarm, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising the steps of:
the computer system determining a meaning of natural language input provided by a user by using natural language processing, the meaning of the natural language input specifying (i) the alarm, (ii) an event which will occur at a time that is indefinite and unscheduled, (iii) an action to be taken by the user, and (iv) an amount of time, wherein the alarm notifies the user about the action to be taken prior to the event and the alarm is triggered at a time that precedes an estimated starting time of the event by the amount of time;
the computer system retrieving information that includes data describing movements of a mobile device of the user, data describing usage of the mobile device, profile information about the user, historical behavior of the user, appointments in a calendar application used by the user, messages sent and received by the user, content generated by the user on a social networking service, and social networks of the user which are managed by the social networking service;
prior to the event and based on the data describing movements of the mobile device of the user, the data describing the usage of the mobile device, the profile information about the user, the historical behavior of the user, the appointments in the calendar application used by the user, the messages sent and received by the user, the content generated by the user on the social networking service, and the social networks of the user which are managed by the social networking service, the computer system generating the estimated starting time of the event; and
the computer system determining the time of the alarm as a time that precedes the estimated starting time of the event by the amount of time specified by the meaning of the natural language input determined by using the natural language processing.

10. The computer program product of claim 9, wherein the method further comprises the steps of:
the computer system determining whether a current time is equal to or subsequent to the time of the alarm; and
if the current time is equal to or subsequent to the time of the alarm, the computer system triggering the alarm, which notifies the user about the action to be taken prior to the event, or if the current time is prior to the time of the alarm, the computer system determining that the information was updated subsequent to the step of retrieving the information, and in response and without triggering the alarm, the computer system (i) retrieving an update of the information and based on the retrieved update of the information, (ii) generating an update of the estimated starting time of the event and (iii) determining an update of the time of the alarm as a time that precedes the update of the estimated starting time of the event by the amount of time.

11. The computer program product of claim 9, wherein the method further comprises the step of based at least in part on the event, the computer system identifying one or more sources of the information on which the step of generating the estimated starting time of the event is based, wherein the step of retrieving the information includes retrieving the information from the identified one or more sources.

12. The computer program product of claim 9, wherein the step of retrieving the information includes retrieving a geolocation of the mobile device by using a Global Positioning System navigation device, and wherein the step of generating the estimated starting time of the event is based in part on the retrieved geolocation of the mobile device.

13. The computer program product of claim 9, wherein the step of retrieving the information includes retrieving data from devices in an Internet of Things network, and wherein the step of generating the estimated starting time of the event is based in part on the retrieved data from the devices in the Internet of Things network.

14. The computer program product of claim 9, wherein the method further comprises the steps of:
the computer system determining that the user is in a first location and the event indicates that the user will leave the first location and travel to a second location which is different from the first location;
the computer system generating an initial estimated starting time of the event based on the retrieved information, which does not include data describing a movement of the user away from the first location and toward the second location, wherein the step of generating the initial estimated starting time of the event is performed prior to the user leaving the first location to travel to the second location; and the computer system determining an initial time of the alarm as a time that precedes the initial estimated starting time of the event by the amount of time.

15. A computer system comprising:
a central processing unit (CPU);
a memory coupled to the CPU; and
a computer readable storage device coupled to the CPU, the computer readable storage device containing instructions that are executed by the CPU via the memory to implement a method of determining a time of an alarm, the method comprising the steps of:
the computer system determining a meaning of natural language input provided by a user by using natural language processing, the meaning of the natural language input specifying (i) the alarm, (ii) an event which will occur at a time that is indefinite and unscheduled, (iii) an action to be taken by the user, and (iv) an amount of time, wherein the alarm notifies the user about the action to be taken prior to the event and the alarm is triggered at a time that precedes an estimated starting time of the event by the amount of time;
the computer system retrieving information that includes data describing movements of a mobile device of the user, data describing usage of the mobile device, profile information about the user, historical behavior of the user, appointments in a calendar application used by the user, messages sent and received by the user, content generated by the user on a social networking service, and social networks of the user which are managed by the social networking service;
prior to the event and based on the data describing movements of the mobile device of the user, the data describing the usage of the mobile device, the profile information about the user, the historical behavior of the user, the appointments in the calendar application used by the user, the messages sent and received by the user, the content generated by the user on the social networking service, and the social networks of the user which are managed by the social networking service, the computer system generating the estimated starting time of the event; and
the computer system determining the time of the alarm as a time that precedes the estimated starting time of the event by the amount of time specified by the meaning of the natural language input determined by using the natural language processing.

16. The computer system of claim 15, wherein the method further comprises the steps of:
the computer system determining whether a current time is equal to or subsequent to the time of the alarm; and
if the current time is equal to or subsequent to the time of the alarm, the computer system triggering the alarm, which notifies the user about the action to be taken prior to the event, or if the current time is prior to the time of the alarm, the computer system determining that the information was updated subsequent to the step of retrieving the information, and in response and without triggering the alarm, the computer system (i) retrieving an update of the information and based on the retrieved update of the information, (ii) generating an update of the estimated starting time of the event and (iii) determining an update of the time of the alarm as a time that precedes the update of the estimated starting time of the event by the amount of time.

17. The computer system of claim 15, wherein the method further comprises the step of based at least in part on the event, the computer system identifying one or more sources of the information on which the step of generating the estimated starting time of the event is based, wherein the step of retrieving the information includes retrieving the information from the identified one or more sources.

18. The computer system of claim 15, wherein the step of retrieving the information includes retrieving a geolocation of the mobile device by using a Global Positioning System navigation device, and wherein the step of generating the estimated starting time of the event is based in part on the retrieved geolocation of the mobile device.

19. The computer system of claim 15, wherein the step of retrieving the information includes retrieving data from devices in an Internet of Things network, and wherein the step of generating the estimated starting time of the event is based in part on the retrieved data from the devices in the Internet of Things network.

20. The computer system of claim 15, wherein the method further comprises the steps of:
the computer system determining that the user is in a first location and the event indicates that the user will leave the first location and travel to a second location which is different from the first location;
the computer system generating an initial estimated starting time of the event based on the retrieved information, which does not include data describing a movement of the user away from the first location and toward the second location, wherein the step of generating the initial estimated starting time of the event is performed prior to the user leaving the first location to travel to the second location; and
the computer system determining an initial time of the alarm as a time that precedes the initial estimated starting time of the event by the amount of time.

* * * * *